Figure 5:
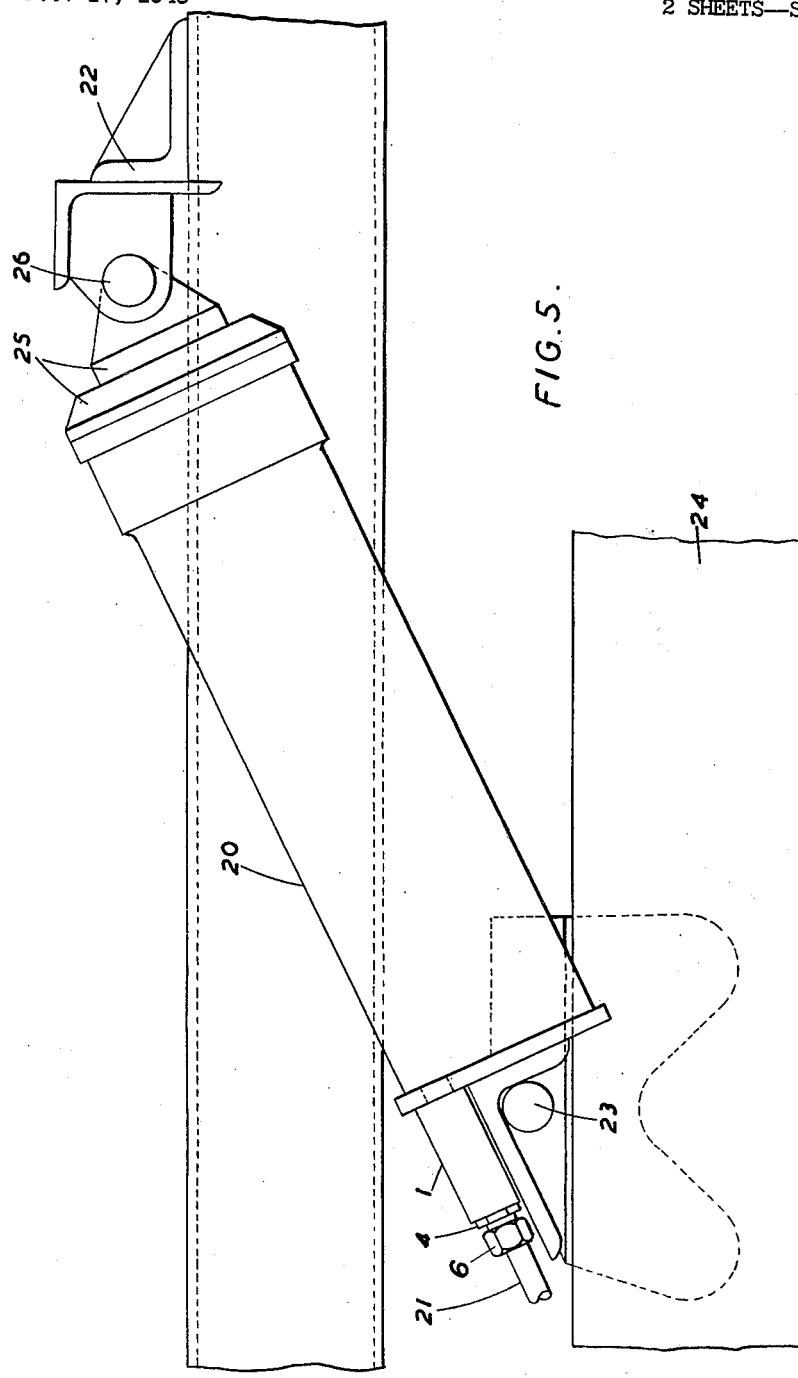

May 6, 1952 J. A. KINNAIRD 2,595,389
TWO-WAY VALVE WITH EXCESS FLOW PREVENTION
Filed Dec. 17, 1948 2 SHEETS—SHEET 1
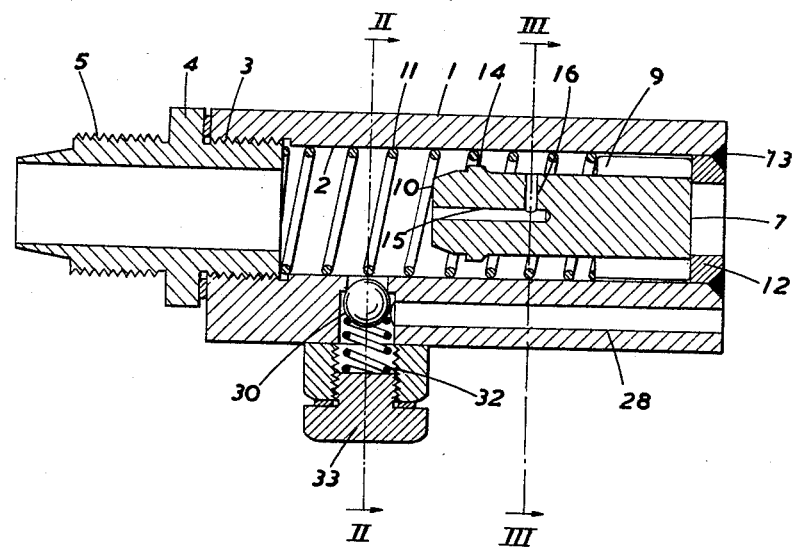
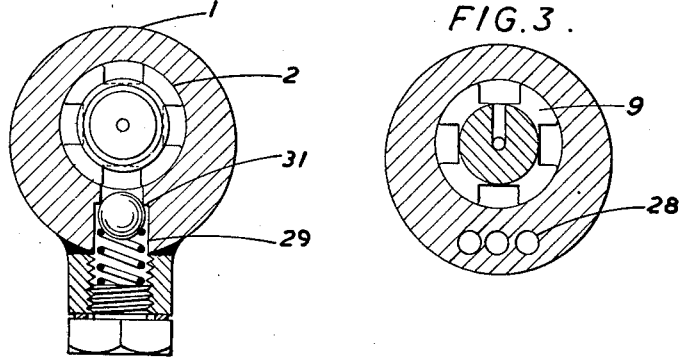
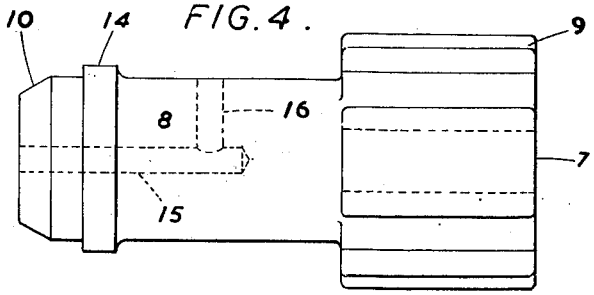
Inventor
JAMES AITKEN KINNAIRD
By Ernest F. Kuehlin
Attorney May 6, 1952   J. A. KINNAIRD   2,595,389
TWO-WAY VALVE WITH EXCESS FLOW PREVENTION
Filed Dec. 17, 1948   2 SHEETS—SHEET 2

Inventor
JAMES AITKEN KINNAIRD
By Ernest J. Mechlin
Attorney

Patented May 6, 1952

2,595,389

UNITED STATES PATENT OFFICE 2,595,389

TWO-WAY VALVE WITH EXCESS FLOW PREVENTION

James Aitken Kinnaird, Braiswick, near Colchester, England, assignor to Bromilow & Edwards Limited, Bolton, England, a body corporate of Great Britain Application December 17, 1948, Serial No. 65,876
In Great Britain December 22, 1947

5 Claims. (Cl. 277—60)

This invention relates to hydraulic pressure operated devices and has more especial reference to safety valves operating automatically to prevent excess flow of the hydraulic medium, usually oil, in tipping and like hydraulic mechanism when such excess flow would cause damage to the mechanism, for example on account of the increased speed of operation particularly towards the end of a cycle of movements.

As one instance, in hydraulic tipping gear for vehicle bodies, it is sometimes necessary to lower a part loaded body in order to tip the remainder of the load elsewhere. In this case the tipper lowering control has to be very carefully operated, otherwise the part loaded body would crash down on to the chassis, probably causing damage to the tipping mechanism or chassis frame. By providing the automatic valve according to the present invention, the loaded body would not be able to return to the chassis any more quickly than would be the case with an empty body, even should the tipper control valve be fully opened or should a burst take place in a pipe conveying the hydraulic medium to the ram, container, or pump of the tipping gear.

Broadly stated, the improved automatically operating safety valve for preventing excessive flow in hydraulic pressure-operated devices such as hydraulic tipping mechanism, comprises a cylinder or barrel in which a longitudinally fluted slide or piston can move in one direction of hydraulic fluid flow towards a valve seat against spring resistance from a position to which it is urged by the spring when the fluid flow is in the other direction, a by-pass controlled by a one-way valve to permit the passage of fluid through the by-pass in that other direction only, and a bleed duct of relatively small cross section through the slide or piston, the fluid normally passing freely in the first direction through the flutes of the slide or piston but excess flow causing the slide or piston to move to its valve seat and leave only the bleed duct through the piston whereby to restrict the flow.

The valve seating may be formed by the inner annular end-face of an internally cylindrical outlet adapter screwed into the end of the cylinder or barrel and this end-face may also serve as an abutment for a coil compression spring working at its other end against the fluted portion of the piston or slide.

Preferably such piston or slide includes a shanked portion within the coil spring terminating in a chamfered end more easily to lead into the cylindrical interior of the adapter and, it may be, having a peripherally projecting flange or collar to co-operate with the valve seating.

The fluted piston or head of the slide or piston may be provided with a limit stop in the form of an internal rib on, or a ring welded to, the cylinder or barrel at the end remote from the adapter and this may be furnished with an annular seating co-operating with the fluid head of the piston or slide to obturate the passage of the hydraulic medium through the barrel to the ram, the feed of the medium whereto takes place through the by-pass.

The small-bore bleed duct provides communication between the inlet and outlet ends of the valve cylinder or barrel when the piston is moved by the excess flow or pressure of the fluid medium on to its valve seat to shut off passage through the flutes in the piston and around the shank, the bore of the bleed duct being sufficiently small to cause the rate of flow through the valve to be considerably reduced and, therefore, reducing correspondingly the speed of the hydraulic mechanism concerned.

In one embodiment applied to tipping mechanism for vehicles, the by-pass is formed by a plurality of small parallel bores in the wall of the barrel, a one-way ball valve being positioned to permit the flow of hydraulic medium from the adapter through such bores for raising the body, while, for lowering, the medium is forced to pass through the automatic safety valve itself so as to be controlled thereby.

The invention will be further described with reference to the accompanying drawings where this embodiment is illustrated by way of example and wherein Fig. 1 is a longitudinal section of the safety valve, Figs. 2 and 3 being cross-sections on the lines II—II and III—III of Fig. 1 respectively, while Fig. 4 is an elevational view of the fluted slide or piston removed.

Fig. 5 shows the valve installed in a hydraulic tipping system.

Referring first more particularly to Figs. 1 to 4, the body of the safety valve in this embodiment comprises a tube or barrel 1 having an eccentric cylindrical bore 2 with a tapped main inlet passage 3 at one end to take a flanged adapter or pipe union 4 threaded at 5 to receive a union nut such as that shown at 6 in Fig. 5.

Within the cylindrical bore 2 is a fluted slide or piston valve 7 having a shanked portion 8 projecting forwardly from the ribs between the flutes 9 which ribs are a sliding fit in the bore 2, such shanked portion terminating in a chamfered or conical end 10 more easily to lead into the cylindrical interior of the adapter 4.

The inner end of the adapter 4 serves as an abutment for a coil compression spring 11 in the bore 2 around the shank 8 which spring engages the ends of the ribs between the flutes 9 and normally urges the piston valve to the position shown in Fig. 1 with its rear end seated on a ring 12 welded in the return inlet passage of the valve body or barrel at 13.

The inner end of the adapter 4 also constitutes a seat for the front annular surface of a shoulder or collar 14 on the shanked portion 8 of the piston valve, the arrangement being such that the fluid under pressure on the fluted end of the piston valve 7 can move the latter to the left against the compression spring 11 and can then flow between the flutes 9 and around the shanked portion 8 and collar 14 to the adapter 4. Should the pressure become excessive however, the piston valve is moved so far to the left that the annular shoulder 14 seats on the rear of the adapter 4 and obturates the passage therethrough except for the restricted amount which is afforded passage through a bleed duct consisting of two intersecting bores 15 and 16 in the piston valve, one axial and central bore 15 opening into the adapter and the other radial bore 16 opening into the cylinder 2.

Referring now also to Fig. 5 where the valve is shown installed, by way of example in an hydraulic tipping gear having a slant type ram, 20 represents the ram cylinder to which the hydraulic medium, usually oil, is fed through a pipeline 21 when the control valve (not shown) is operated to raise the body, a portion of which is shown at 22, for tipping.

The improved safety valve is shown in the pipeline 21 connecting the control valve with the base of the ram cylinder 20 and is in fact welded to the base of the ram cylinder which is trunnioned at 23 on the vehicle chassis 24 and has its ram head 25 similarly trunnioned at 26 to the body 22.

Oil is fed to the ram cylinder 20 by the pump through the pipeline 21 to the union 4 of the safety valve and under these conditions the pressure of the oil bears on the shanked end 10 of the fluted piston 7 and urges such piston in the same direction as the spring 11 so that it seats on the ring 12 as shown in Fig. 1 and closes the direct passage through the valve.

Formed in the barrel 1 of the valve parallel with the bore 2 is a by-pass comprising a series of three bores 28 which as clearly shown in Figs. 1 to 3 branch from a chamber 29 of a one-way outlet ball valve 30 urged against its seat 31 by a spring 32 resting on a screw plug 33, removal of which gives access to the ball valve 30.

Thus the hydraulic medium from the pump is fed to the ram cylinder through the one-way valve controlled by-pass 28 while on the control valve being set for lowering, or the pressure in the conduit 21 falling for any reason, the speed of lowering is regulated by the safety valve 7 which then occupies a position where it is not in contact with the ring 12 or adapter 4, unless there is excessive flow when the pressure of the fluid on its fluted end overcomes the spring 11 and brings the shoulder 14 against its seat on the adapter 4.

What I claim is:

1. A two-way safety valve for preventing excessive flow of fluid in hydraulic mechanism, comprising in combination, a barrel having a main inlet passage for fluid and a return inlet passage and a by-pass outlet passage, a one-way outlet valve in said by-pass passage, a valve seat in said main inlet passage, a slide movable in said barrel and formed with longitudinal flutes, spring means operative to urge said slide away from said valve seat and a valve head on said slide having a bleed duct and operative, when excess flow of returning fluid overcomes the spring means and brings the valve head on the slide into engagement with the valve seat, to confine the flow of returning fluid through said barrel to the said bleed duct.

2. A safety valve according to claim 1 including an annular limit stop in the return inlet passage with which limit stop the slide co-operates to prevent flow of fluid through its flutes to said return inlet passage and confine to the by-pass fluid flowing from the main inlet passage to the mechanism.

3. A safety valve according to claim 2 wherein the bleed duct extends from an end face of the valve head to a lateral opening in the slide.

4. A safety valve according to claim 1 wherein the slide rides in an eccentric bore in the barrel while the by-pass is constituted by a plurality of ducts formed in the thicker portion of the wall of said barrel parallel with the eccentric bore and communicating therewith through a common valve-controlled passage.

5. A safety valve for preventing excessive flow of fluid in hydraulic mechanism, comprising in combination, a barrel having a main inlet passage for fluid and a return inlet passage and a by-pass outlet passage, a one-way outlet valve in said by-pass passage, a pipe union screwed into said main inlet passage, a valve seat formed on the said pipe union, a slide movable in said barrel and comprising a portion formed with longitudinal flutes and a shanked portion having a bleed duct, a coil spring surrounding said shanked portion of the slide and reacting between said pipe union and the fluted portion of the slide to urge said slide away from said valve seat, and a valve head on said shanked portion of the slide operative, when excess flow of fluid overcomes the spring and brings the valve head on the slide into engagement with the valve seat, to confine the flow of returning fluid through said barrel to the said bleed duct, said valve head comprising a chamfered end more easily to lead into the interior of said pipe union and a peripherally projecting collar providing an annular valve face for co-operation with the valve seat.

JAMES AITKEN KINNAIRD.

REFERENCES CITED

The following references are of record in the file of this patent:

UNITED STATES PATENTS

| Number | Name | Date |
| --- | --- | --- |
| 818,411 | Bush | Apr. 24, 1906 |
| 1,871,327 | Kueun | Aug. 9, 1932 |
| 2,353,161 | Heigis | July 11, 1944 |
| 2,367,682 | Kehle | Jan. 23, 1945 |